(12) United States Patent
Bassett

(10) Patent No.: US 11,617,345 B2
(45) Date of Patent: Apr. 4, 2023

(54) ROBOTIC ROTATIONAL GRAZING SYSTEM

(71) Applicant: Underground Agriculture Company, LLC, Sycamore, IL (US)

(72) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 646 days.

(21) Appl. No.: 16/568,469

(22) Filed: Sep. 12, 2019

(65) Prior Publication Data

US 2020/0128785 A1    Apr. 30, 2020

Related U.S. Application Data

(60) Provisional application No. 62/753,267, filed on Oct. 31, 2018.

(51) Int. Cl.
| | | |
|---|---|---|
| *A01K 1/10* | (2006.01) | |
| *E04H 17/10* | (2006.01) | |
| *G05D 1/00* | (2006.01) | |
| *G05D 1/02* | (2020.01) | |
| *B60L 53/51* | (2019.01) | |
| *B60Q 5/00* | (2006.01) | |

(52) U.S. Cl.
CPC ............ *A01K 1/105* (2013.01); *E04H 17/10* (2013.01); *G05D 1/0027* (2013.01); *G05D 1/0231* (2013.01); *G05D 1/0276* (2013.01); *G05D 1/0287* (2013.01); *B60L 53/51* (2019.02); *B60Q 5/00* (2013.01); *G05D 2201/0201* (2013.01)

(58) Field of Classification Search
CPC .. G05D 1/0027; G05D 1/0231; G05D 1/0276; G05D 1/0287; G05D 1/0291; G05D 2201/0201; A01K 3/005; B60L 53/51; E04H 17/10; E04H 17/266; E04H 17/017; B60Q 5/00; G06Q 50/02
See application file for complete search history.

(56) References Cited

U.S. PATENT DOCUMENTS

| | | | | |
|---|---|---|---|---|
| 4,078,771 | A | * 3/1978 | Diggs | A01K 3/005 256/10 |
| 2010/0077960 | A1* | 4/2010 | Van Den Berg | A01K 3/00 119/14.17 |
| 2013/0269625 | A1* | 10/2013 | Van Den Berg | A01K 1/123 119/416 |
| 2020/0097023 | A1* | 3/2020 | Grundey | A01K 29/00 |

\* cited by examiner

*Primary Examiner* — Kenneth J Malkowski
*Assistant Examiner* — Carville Albert Hollingsworth, IV
(74) *Attorney, Agent, or Firm* — Nixon Peabody LLP

(57) ABSTRACT

A robotically controlled system including a fence enclosure that can move and/or shape-shift itself autonomously and automatically without manual intervention. The system includes coils of electric fence wire that are spring-loaded or otherwise tensioned so that the length of electric fence wire between each post robot is able to contract or expand as the system of robots adapts to optimize the shape of the fence enclosure as the entire enclosure is moved by the robots around a field or other grazing pasture on an area of land.

20 Claims, 6 Drawing Sheets

ROBOTIC ROTATIONAL GRAZING SYSTEM

CROSS-REFERENCE TO RELATED APPLICATIONS

This patent application claims the benefit of U.S. Provisional Application No. 62/753,267, filed Oct. 31, 2018, which is incorporated by reference in its entirety.

BACKGROUND

Rotational grazing of livestock is well understood within the literature to have many benefits including building soil health while feeing a herd of animals. Rotational grazing can also promote a uniform distribution of manure while preventing overgrazing, which damages the soil and causes erosion.

However, rotational grazing can be very labor-intensive because herds of animals need to be moved as quickly as every few hours to new grazing sources.

What is needed is a robotic system that automatically moves a herd of grazing animals based on GPS coordinates obtained by robot machines positioned on an area of land for grazing animals.

SUMMARY OF THE PRESENT DISCLOSURE

Instead of a fence having all conventional static or fixed fence posts dug into the ground, disclosed herein is a robotically controlled system including a fence enclosure that can move and/or shape-shift itself autonomously and automatically without manual intervention. The system includes coils of electric fence wire that are spring-loaded or otherwise tensioned so that the length of electric fence wire between each post robot is able to contract or expand as the system of robots adapts to optimize the shape of the fence enclosure as the entire enclosure is moved by the robots around a field or other grazing pasture on an area of land.

BRIEF DESCRIPTION OF THE ILLUSTRATIONS

DETAILED DESCRIPTION

Figure 1:
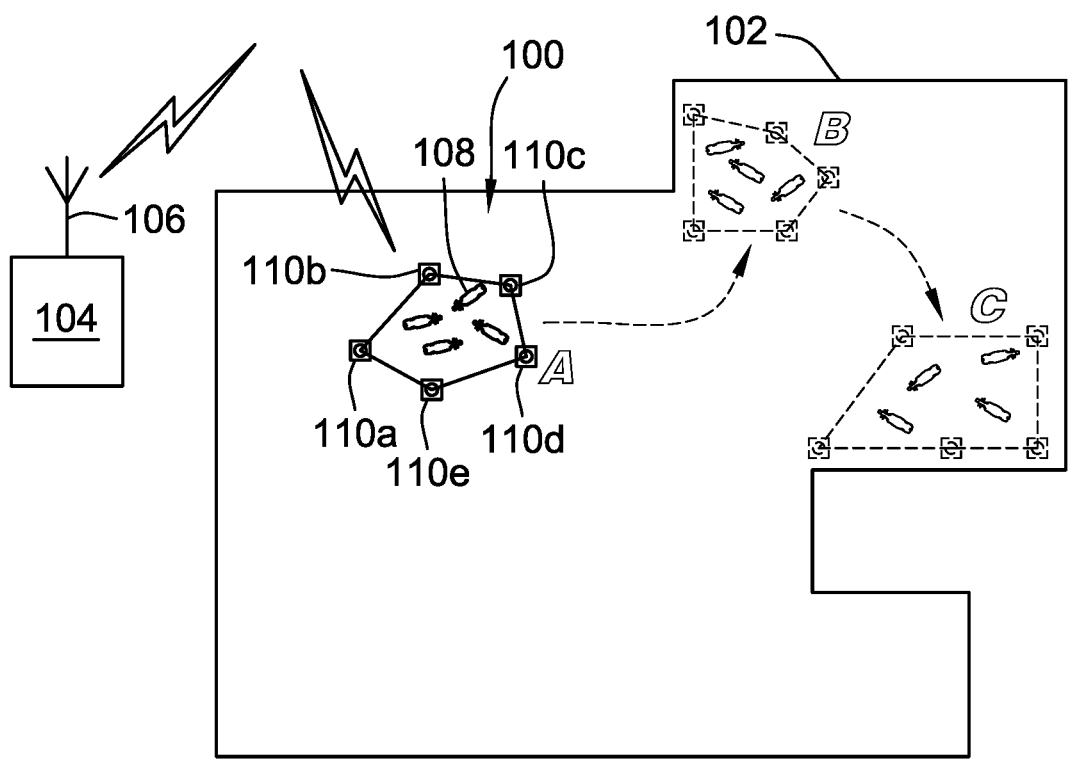
FIG. 1 illustrates an example system of autonomously and automatically moving robot machines connected together to form a fence enclosure to contain grazing animals within the fence enclosure.

FIG. 1 illustrates an example system 100 of autonomously and automatically moving robot machines 110a-110e connected together to form a fence enclosure to contain grazing animals 108 within the fence enclosure. Five example robot machines 110a-110e are shown for ease of discussion, but it is intended that the system 100 can include fewer or more mobile (roving) robot machines 110, and one or more fixed or static posts that are not movable. For example, in a system 100 having two robot machines, a static fence post can also be present to allow a triangular configuration for the fence enclosure. In systems where there are no fixed fence posts, the entire assembly of robot machines can move synchronously to a new location on an area of land, which does not have to be flat, and can include bodies of water, such as a river, or other non-grazing areas, such as exposed rock formations or dirt.

In the example shown in FIG. 1, the system 100 of robot machines 110a-110e is positioned on an area A of land, and moves to area B, and finally to area C, each time changing a shape configuration of the fence enclosure according to a grazing optimization algorithm that automatically determines the optimum position and locations of the robot machines 110 and areas to form fence enclosures on the plot of land 102, having a perimeter that can be irregularly shaped such as shown in FIG. 1 or non-contiguous. The perimeter coordinates 102 along with coordinates of any non-grazing areas (e.g., a river or other body of water, rocks, patches of dirt) within the plot of land, can be stored in the system 100 so that the robot machines 110 can avoid creating a fence enclosure around non-grazing areas. Alternately, when it might be desired to have the grazing animals rest or stop grazing, the robot machines 110 can be configured to create a fence enclosure that at least partially includes a non-grazing area. Additionally, areas of shade, such as where trees are present, can also be stored in the system 100, and during hot days, the fence enclosure can include trees, or when lightning is present, the fence enclosure can move grazing animals away from trees or other hazards.

A remote controller device 104 can communicate wirelessly with the system 100 via a wireless transceiver 106 using any wireless technology or protocol. Examples of the remote controller device 104 can be a computer server, a smartphone, a laptop computer, a remote control with joysticks, a wireless access point, or a combination thereof. In an embodiment, the optimum positioning of the robot machines 110a-110e is communicated to one of the robot machines 110a-110e by the remote controller device 104. The remote controller device 104 can use a grazing optimization algorithm to automatically determine the optimum position and locations of the robot machines 110 and areas to form fence enclosures on the plot of land 102. In some implementations, only one of the robot machines 110 communicates with the remote controller device 104. The robot machine 110 that communicates with the remote controller device 104 acts as a master machine for the system 100, relaying the determined optimum positions to each of the other robot machines 110.

In some implementations, the master machine is selected based on remaining battery life, where the robot machine 110 with the most battery life is designated as the master machine. That way, the master machine can utilize higher power wireless communication technologies (e.g., 3G, 4G, LTE, Wi-Fi, and so on) to communicate with the remote controller device 104 but then utilize medium to lower power wireless communication technologies (e.g., Bluetooth, Bluetooth Low-Energy, Zigbee, and so on). The robot machines 110 can organize in a mesh network for communication within the system 100, with the master machine being a designated robot machine to receive instructions from outside of the system 100 and send status reports to the remote controller device 104.

In some implementations, the robot machines 110 communicate via low powered signaling on a wired connection. Since the robot machines 110 serve as posts for the fence enclosure, the wired connection can be routed via the fence wires that define the grazing area for the animals 108.

Figure 2:
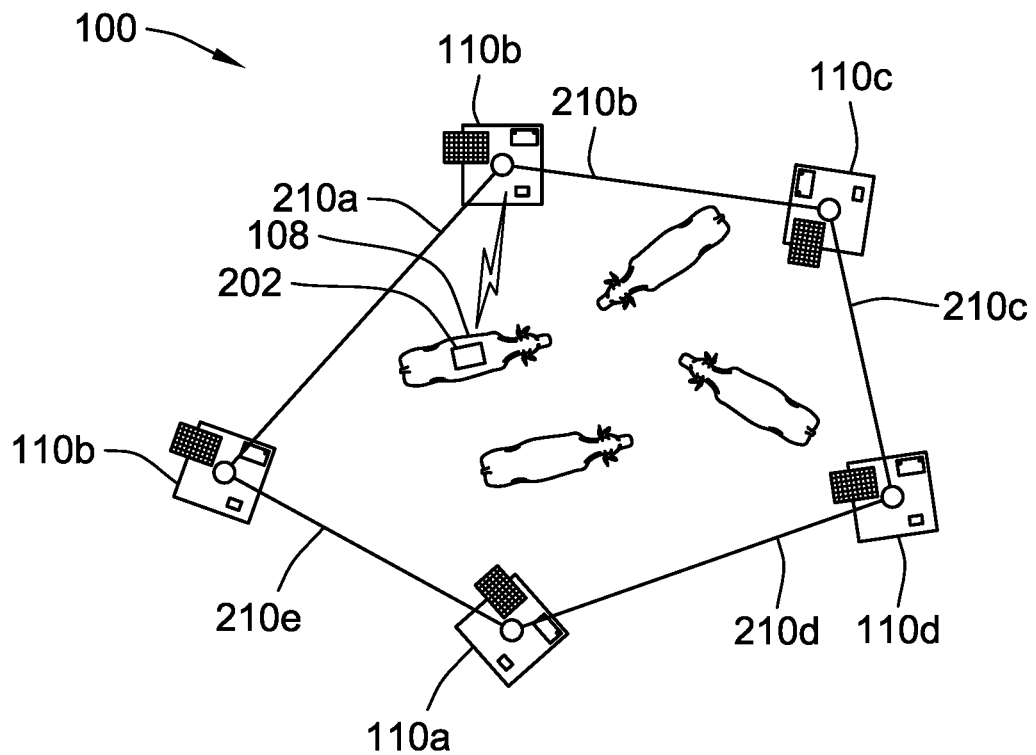
FIG. 2 illustrates an example fence enclosure shown in FIG. 1 where the robot machines act as autonomously moving fence posts to form a fence enclosure surrounding grazing animals.

FIG. 2 illustrates the example system 100 shown in FIG. 1 in more detail. At least one of the animals 108 within the fence enclosure can include a sensor 202, which can wirelessly communicate information about the animal 108 to one or more of the robot machines 110a-110e. Multiple robot machines 110 can use triangulation to continuously or periodically determine and/or track the location of the animal 108 or each of the animals 108 within the fence enclosure of the system 100. The sensor 202 attached or secured to the animal 108 can include a haptic device and corresponding electronic controller device to emit haptic signals to the animal 108, for example, to cause the animal 108 to move to a new location. By coordinating the movements of the animals 108 within the fence enclosure of the system 100, grazing consumption activity can be optimized to promote relatively uniform consumption of grass and distribution of manure within the fence enclosure.

The sensor 202 can be affixed, for example, to a collar secured around a neck of the grazing animal 108, or through a piercing of an ear of the grazing animal 108, and can include a power source such as a battery to power one or more sensors configured to collect information about the grazing animal, a controller device, and a wireless communication interface, such as a wireless transmitter. In cases where the sensor 202 is configured to send haptic feedback to the animal, the wireless communication interface can include a wireless transceiver. The one or more sensors can include an accelerometer to detect whether the animal is standing or running, for example, or has fallen suddenly. The one or more sensors can include a thermometer to detect a temperature of the grazing animal to cause the system 100 to raise an alert when the detected temperature falls outside a range. The one or more sensors can include a GPS receiver configured to receive a coordinate position (including altitude) of the grazing animal, which can be transmitted via the wireless communication interface to one or more of the robot machines 110. The sensor 202 can also be used to detect whether the animal 108 has escaped or moved outside of the fence enclosure, and to raise an alert to indicate a position or last known position of the grazing animal 108, the robot machine 110 that was closest to the point of exit of the fence enclosure, and/or the time that the grazing animal 108 moved outside the fence enclosure.

One or more of the robot machines 110 can use the sensor 202 to determine how many animals are within the fenced enclosure. Using distance of the sensor 202 on each animal within the fenced enclosure and one or more of the robot machines 110, triangulation or other mathematical algorithm can be used by one or more of the robot machines 110 to determine a number of animals within the fenced enclosure and the location of the animals within the fenced enclosure. The location information can be relayed to the remote controller device 104 such that a user of the remote controller device 104 can display the animal location on a map or some other graphical representation. The location information can also include location of each of the robot machines 110 so that the map can also indicate position of the robots and/or shape of the fenced enclosure.

In an embodiment, the location information contains filtered information. For example, the robot machines 110 can send information on only a certain number of animals that continually approach the boundary of the fenced enclosure or that continually come close to the robot machines 110. In another example, the robot machines 110 can send location information on animals that are deemed to be sick, e.g., animals with abnormally low and/or high body temperatures. In another example, the robot machines 110 can send location information on animals that have not moved in a predetermined amount of time. That is, if the sensor 202 is a motion sensor or a sensor that detects heart rate or breathing, and the animal fails to register meaningful data from the sensor 202, then the location of the animal can be sent to the remote controller device 104.

A passive system is also contemplated, wherein one or more of the robot machines 110 includes an imaging device, such as a camera, to monitor the grazing animals within the fence enclosure and to automatically recognize, using, for example, a pattern recognition or an anomaly detection algorithm, when a grazing animal has or is about to move beyond the perimeter defined by the fence enclosure.

In an embodiment, one or more of the robot machines 110 includes an infrared camera or infrared thermometer for determining whether the grazing animals 108 are close to or about to move beyond the perimeter defined by the fence enclosure. In some implementations, for conservation of battery life, proximity sensors and motion detectors can be included on the robot machines 110 such that the robot machines 110 only track the animals 108 when they come close to the robot machines 110. Motion detectors can be used to trigger an alarm or cause a sound via speakers on the robot machines 110 to scare the animals 108 away from the robot machines 110.

The robot machines 110 can also include a speaker for providing beeps to warn and guide the animals 108 to start moving. The sounds provided can be based on a learned sound that the animals 108 respond to. It can be a person's voice or can be provided outside of human auditory range but within the auditory range of the animals 108. The robot machines 110 can coordinate the sounds in the direction they want the animals 108 to move. For example, the robot machines 110 on one side of a grazing area can gradually increase the volume of the sound while robot machines 110 on an opposite end do not play any sound. That way, the animals 108 can be trained to move away from a loud area within the fenced enclosure to a quieter area within the fenced enclosure. In some implementations, the animals 108 are attracted to the sound, so an opposite strategy is used to move the animals 108 towards a loud area within the fenced enclosure. As the animals 108 move, the robot machines 110 also move with the animals 108, guiding them to a different area on the plot of land 102.

In some embodiments, the robot machines 110 use the sensors for monitoring the animals 108 to detect whether an intruder, a predator animal, or some other animal is present or close to the fenced enclosure. The robot machines 110 can also produce sound to scare away the intruder or predator animal. The robot machines 110 can communicate the presence of the intruder or predator animal to the remote controller device 104.

In some embodiments, the robot machines 110 can coordinate movements to move the animals 108 toward a watering hole or a milking parlor to be milked. The robot machines 110 can also coordinate movements to move the animals 108 to a building (e.g., a barn) or some other fenced or holding area for milking.

Still referring to FIG. 2, the robot machines 110 have been automatically positioned to form a fence enclosure having a perimeter structurally defined by a fence wire, which can be energized to form an electric wire loop having wire sections or portions 210a-210e. Fences of this type are called electric fences and divert a time-limited quantity or pulse(s) of non-lethal electric current at high voltage through a grounded body that comes into contact with any part of the electric wire loop. Appropriate dielectric materials are used to keep the wire taut from post to post and from drooping to the ground. In the case of the robot machines 110, dielectric couplers and tubes allow a section of the electric wire loop to pass through the robot machine without electrically coupling to any part of the robot machine or to a physical support that maintains the wire at a distance above the ground.

Each of the robot machines 110a-110e includes a wire tensioner device (including, for example, a motor or other actuator to reel in or let out a section of wire) coupled to a support around which the section of wire is wound or by which the wire section is gripped, so that the wire can be coiled or otherwise retracted and retained inside the robot machine to allow adjustable distances from one adjacent robot machine to the other as the robot machines traverse the field 102 together and away or toward one another to create or maintain a perimeter shape of a fence enclosure at the same or a new grazing location. It is important that the wire loop form a taut fence enclosure to contain the grazing animals 108, so the actuators or tensioners inside the robot machines 110 can include torque sensors and clutch devices to ensure that a consistent tension or tautness is applied on the wire loop to create a taut loop defining the fence enclosure. While one wire loop is shown in FIG. 2, it is also contemplated that more than one wire loop can be present, but of course adjacent wire loops cannot contact one another and must always be separated by a vertical distance sufficient to prevent arcing.

The robot machines can also include an actuator configured to change a vertical angle of the support by which a fence wire is supported to adjust a position of the fence wire above a ground surface of an area of land and to prevent the fence wire from contacting the ground surface. For example, when the land inside the fence enclosure has different elevations, some robot machines 110 will be at a higher elevation relative others, so there is a possibility that the fence portions at different elevations will come close to or touch the ground. To avoid this possibility, one or more lift arms (shown in FIG. 3) 304, 306 can be moved by one more actuators 308 to adjust a vertical height of the support post 302 of the robot machine 110.

Figure 3:
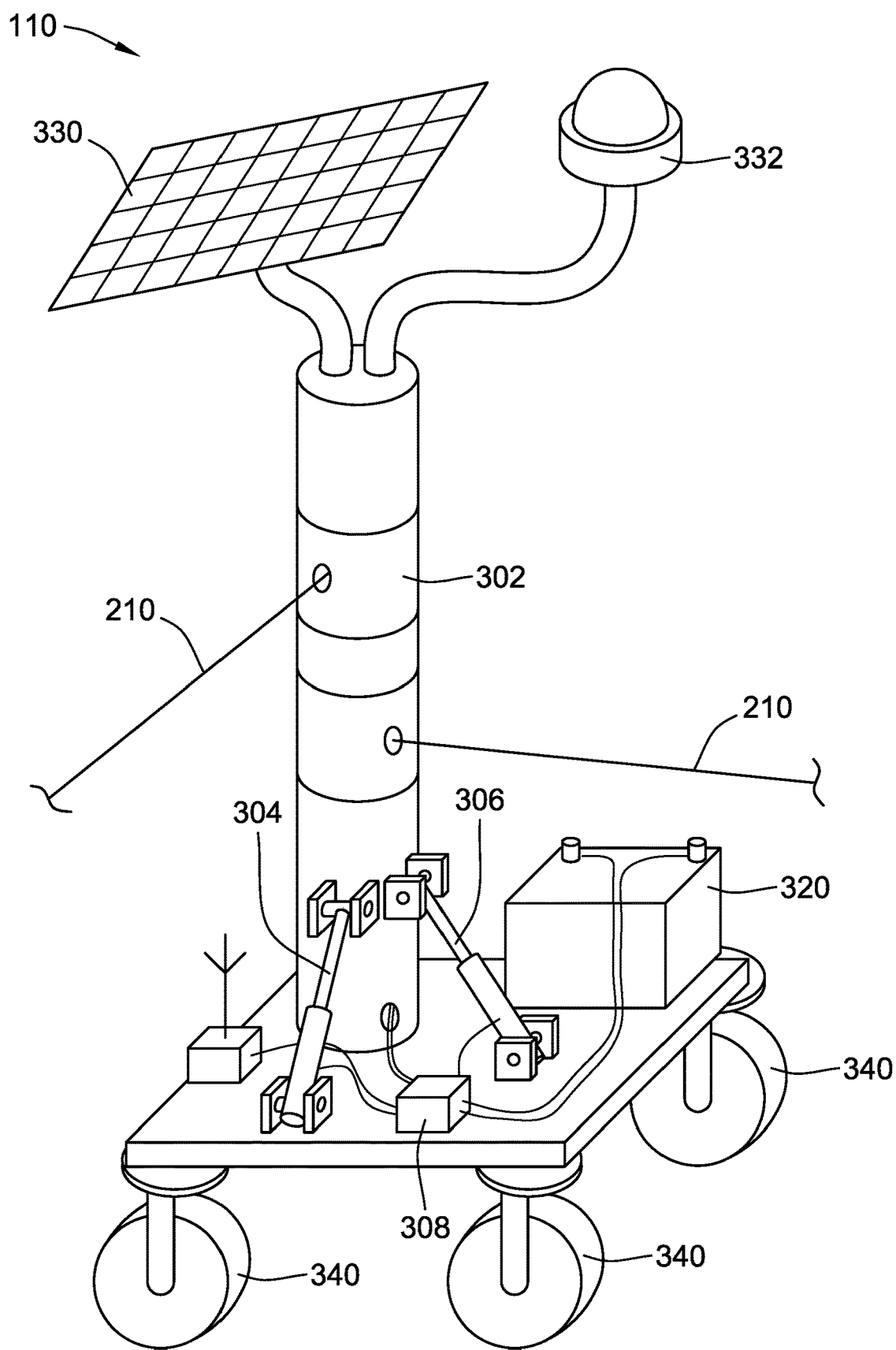
FIG. 3 is an illustration of one of the autonomous robot machines shown in FIG. 1.
Figure 4:
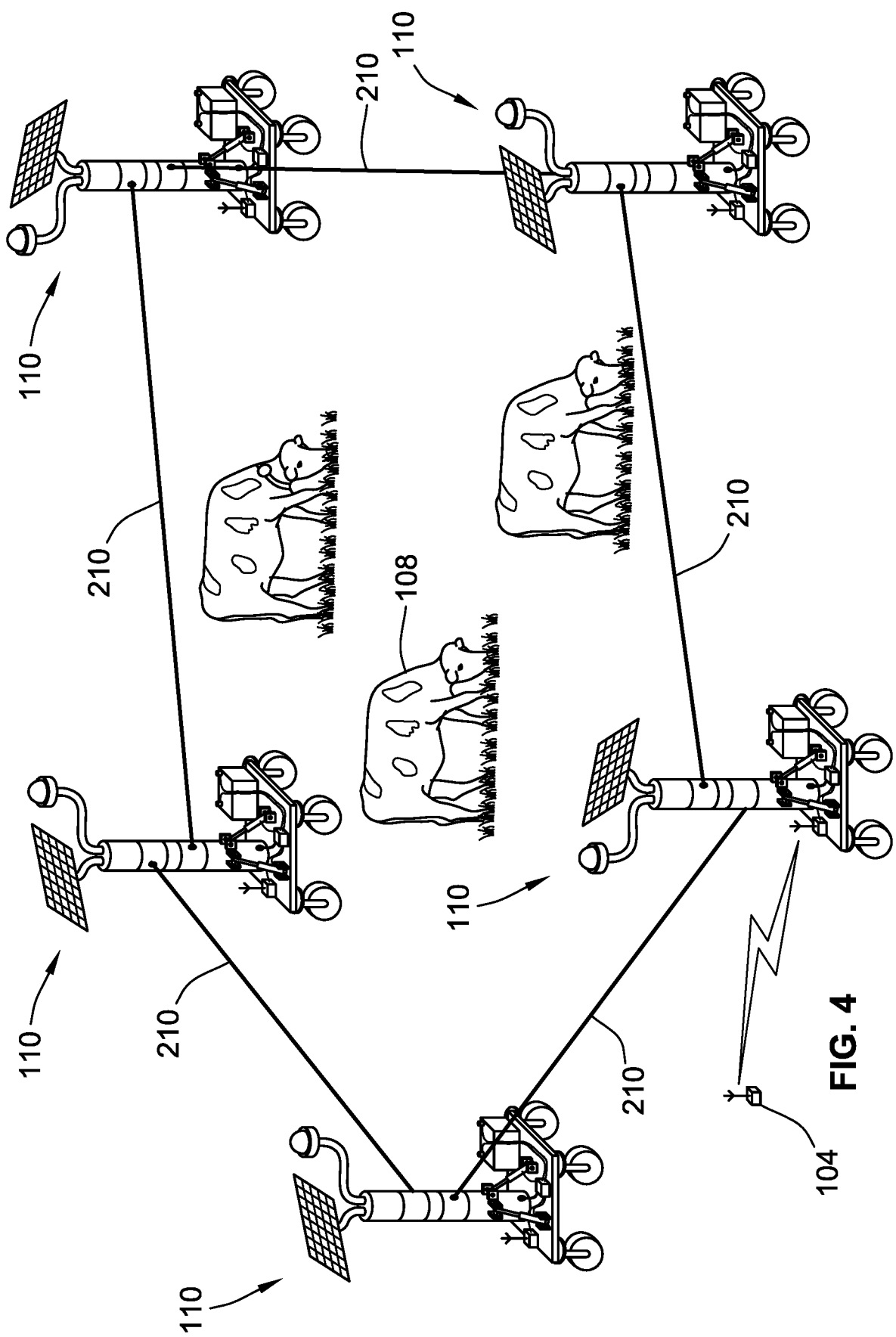
FIG. 4 is a perspective illustration of the fence enclosure shown in FIG. 2 where at least one of the robot machines communicates wirelessly with a remote controller device.

Each of the robot machines 110 includes an electronic controller that controls a motor assembly that powers a motorized locomotion assembly to cause each robot machine to move in coordination with others of the robot machines to maintain the fence enclosure from one grazing location to another. The motorized locomotion assembly can include one or more gears and wheels, treads, or other structures for moving the robot assembly across a field or pasture that has grass and can be slightly bumpy at random places or feature rocks, stones, or other impediments to smooth traversal across the field or pasture. Those skilled in the art will appreciate how to configure wheels or treads for optimized movement, keeping in mind that the robot machines do not need to move at a great speed and should preferably consume as little power as possible to avoid draining a battery 320 which is charged by one or more solar panels 330 (FIG. 3).

While the robot machines are self-driving around an area of land, simultaneously each robot machine 110 can be adjusting, as needed, the angle of their respective support post 302 and the tension on the respective portion of the wire loop passing through each robot machine 110. They can also be sending coordinates and receiving instructions from the remote controller device 104 or communicating instructions to other robot machines 110 and/or to a remote controller device 104 via their respective wireless transceiver. Communication with one another and/or with a remote controller device 104 is used to coordinate the individual movements of each of the robot machines so that they can move synchronously to different grazing locations as a group while continuously tethered together by the wire loop and without breaking or slackening the tautness of the wire loop. For example, one of the robot machines can be designated a master that instructs other slave robot machines where to move, or the remote controller device 104 can operate as a master device that instructs all of the robot machines 110 on the next grazing location.

The robot machines 110 can be configured to maintain the same or a different configuration of the fence enclosure, which includes its perimeter shape and the overall surface area of the fence enclosure. If one robot machine loses power or becomes disabled, the other robot machines can adjust their movements accordingly, treating the disabled robot machine as a fixed fence post until the disabled robot machine can be brought back to an operational state.

The robot machines 110 determine that another robot machine is disabled when communication between the robot machines 110 is lost. The robot machines 110 can also determine that another robot machine is disabled by receiving a message from the remote controller device 104, or while moving, sensing dropping tension in the fence wire 210 and determining that if tension goes below a threshold tension, then the robot machine is disabled.

In addition, the remote controller device 104 or other master device (such as one of the robot machines 110) can be configured to determine a period of time within the area of land is to be grazed by the grazing animals and can determine a path (e.g., from A to B or from B to C as shown in FIG. 1) and a movement timing of each of the robot machines to carry out rotational grazing of the area of land. The configuration can further include topographical elevation information of the area of land, so that the support posts of each of the robot machines can be automatically tilted to keep the wire loop relatively parallel to and substantially at a uniform height above the ground about its entire perimeter to maintain the integrity of the fence enclosure and to prevent creating opportunities for the grazing animals to escape while the robot machines are moving to a new grazing location, which can include land at different elevations compared to a previous grazing location.

Any of the robot machines 110 can have an imaging sensor 332, such as a digital camera, to detect information about the grazing animals 108 within the fence enclosure. The electronic controller of the robot machines 110 can be configured to communicate a signal indicating that the one or more of the grazing animals 108 has escaped the fence enclosure as detected by the imaging sensor. The robot machines 110 can be configured to communicate wirelessly with a sensor 202 (shown in FIG. 2) secured to at least one of the grazing animals 108 and to communicate data received or based on from an output of the sensor to the remote wireless transceiver or the remote controller device 104, such as shown in FIG. 3.

Each of the robot machines 110 can include a solar panel 330 and a battery 320 recharged by the solar panel 330 and provide power for the motor assembly, the electronic controller, and an electric wire loop 210 of the fence enclosure. Angle of the solar panel 330 can be adjusted to capture as much sun rays as the sun moves throughout the day or as the robot machines 110 move about from one area on the land 102 to another.

Cameras on the robot machines 110 can be used to avoid rocks, manure, trees, or other obstacles while moving the animals 108 to a new grazing area. Computer vision algorithms can be used to recognize and categorize objects as obstacles. Computer vision algorithms can also be used to identify trees and determine darker areas around the trees to identify shaded areas. The robot machines 110 can guide the animals 108 to the shaded areas on hot days based on temperature readings from the temperature sensors (not shown) on the robot machines 110.

The robot machines 110 can include weather systems which can obtain forecast information from a device, e.g., the remote controller device 104, so that the robot machines 110 avoid trees during inclement weather. For example, the robot machines 110 avoid trees during lightning, but on a sunny day when temperature is very high, the robot machines 110 move toward trees to shade the animals 108.

The robot machines 110 can monitor each other's movement such that if a robot machine topples over, an alarm can be sent to the remote controller device 104. Any of the robot machines 110 can send the alarm, or the robot machine 110 that fell can send the alarm. The location of the robot machine that fell can also be sent to the remote controller device 104 to identify the type of alarm being sent. In some embodiments, two or more alarm messages are sent from two or more robot machines to indicate that the alarm is not generated by accident.

Figure 5A:
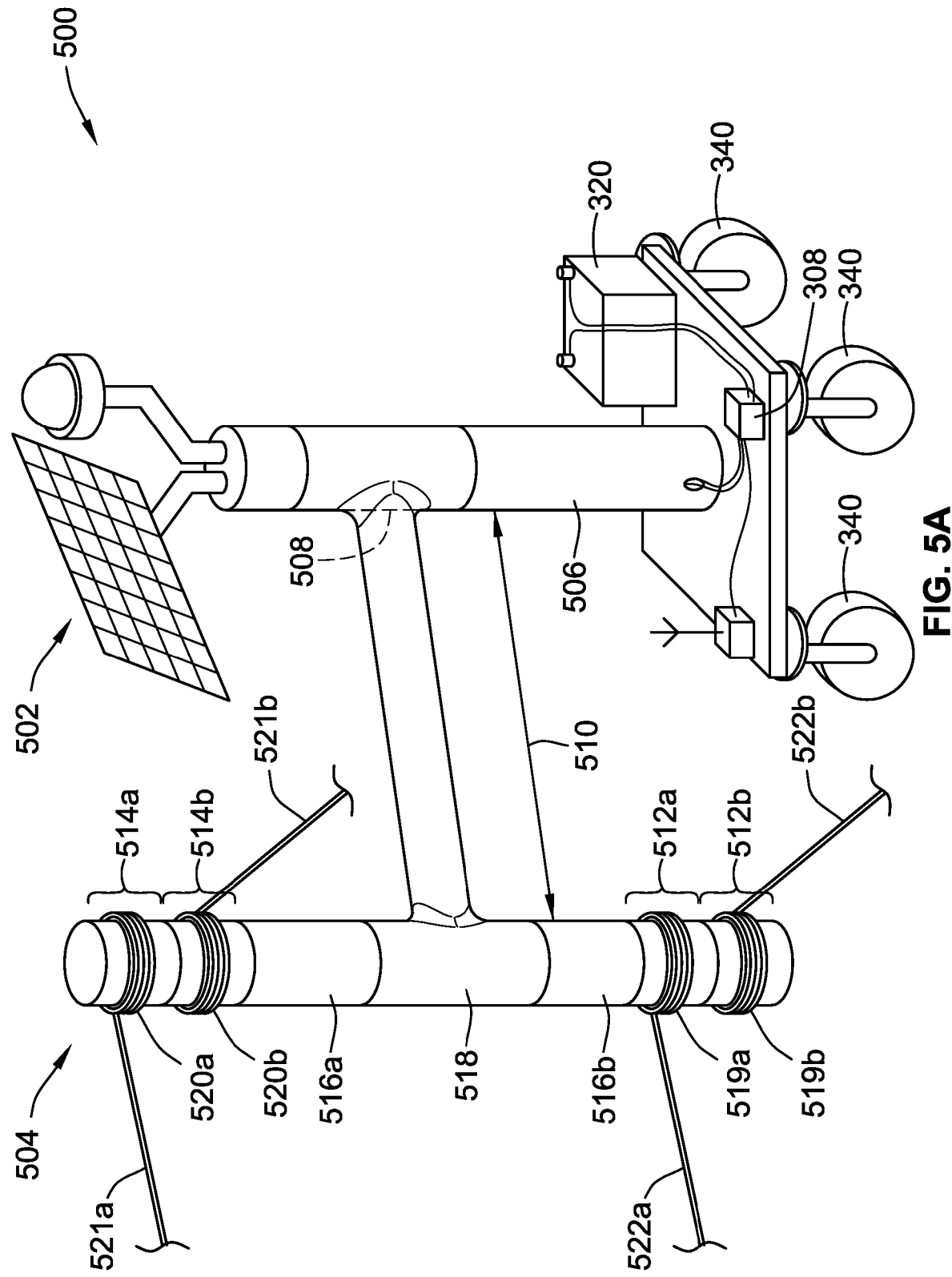
FIG. 5A is an illustration of an example autonomous robot machine according to an embodiment of the disclosure.

FIG. 5A is an illustration of an example robot system 500 of an autonomous robot machine 502 coupled to a fence post 504 according to an embodiment of the disclosure. The autonomous robot machine 502 is an example of robot machine 110 (as shown in FIG. 3) with a different midsection region. The fence post 504 includes one or more top sections 514 (e.g., 514a and 514b as shown in FIG. 5) for routing top fence wires 521 (e.g., 521a and 521b as shown in FIG. 5). The fence post 504 can also include one or more bottom sections 512 for routing one or more bottom fence wires 522. Although not shown in FIG. 5, there the fence post 504 can include other sections in-between the top sections 514 and the bottom sections 522 for routing fence wires.

The top fence wire 521a is wound around a wire dispenser 520a. The wire dispenser 520a is controllable by the robot machine 502 for setting tension in the top fence wire 521a. A wire tensioner device (including, for example, an actuator to reel in or let out a section of wire) is included in each of the top sections 514 and bottom sections 512. That way, tension in the top fence wire 521b is controlled via wire dispenser 520b, tension in the bottom fence wire 522a is controlled via wire dispenser 519a, tension in the bottom fence wire 522b is controlled via wire dispenser 519b, and so on.

Figure 5B:
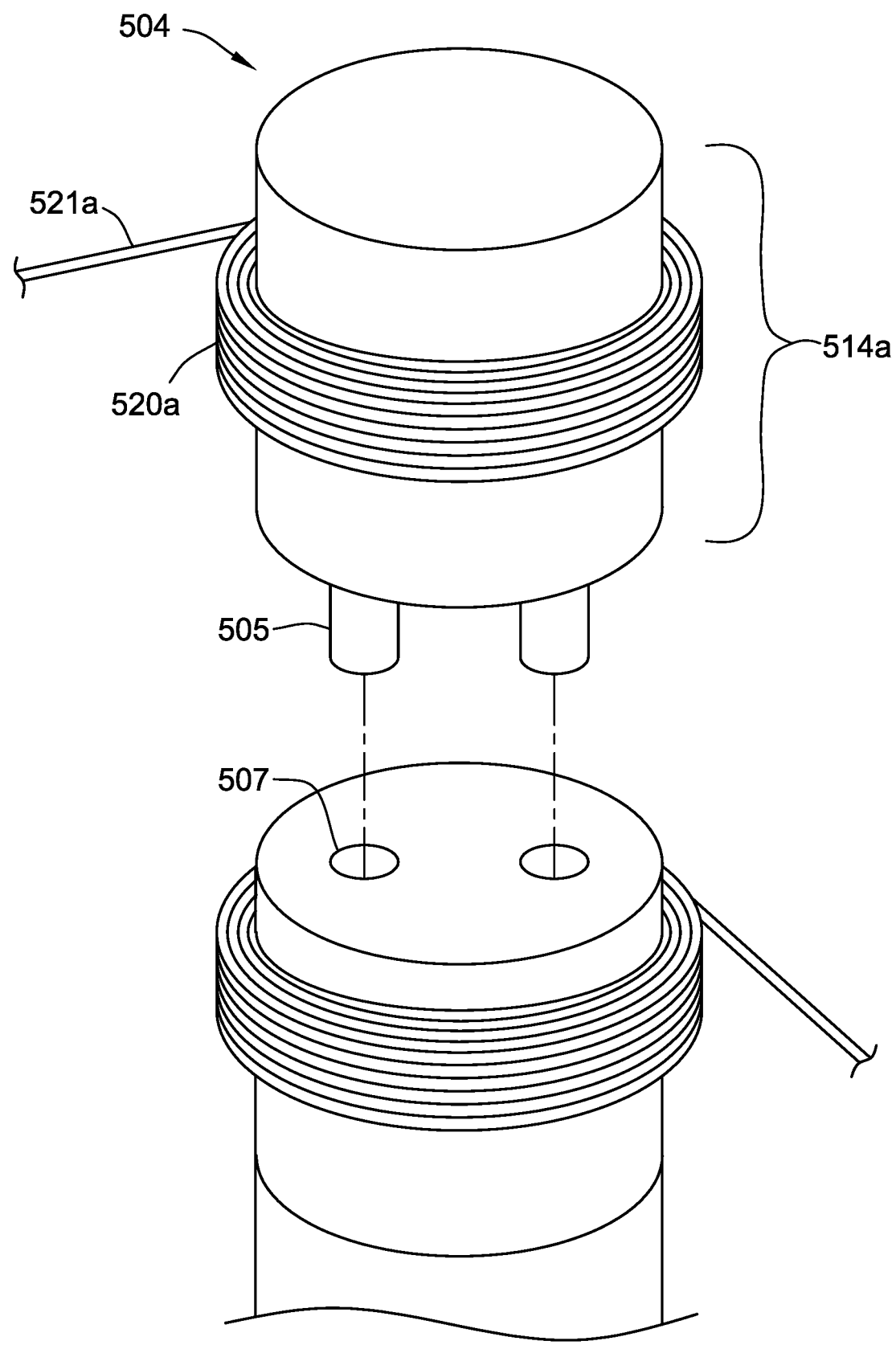
FIG. 5B is an illustration of a fence post with a detachable top section according to an embodiment of the disclosure.

In some implementations, one or more of the top sections 514 and/or one or more of the bottom sections 512 is removable. Some of the top sections 514 and/or the bottom sections 512 can include connection interfaces for receiving electrical and/or mechanical connectors. FIG. 5B illustrates an example where the top section 514a is detachable from the fence post 504. Male connectors 505 and female connectors 507 are illustrated for connecting the top section 514a to the rest of the fence post 504.

The fence post 504 can include one or more retractable or adjustable sections 516. For example, a top adjustable section 516a can be used to adjust the height of the top fence wires 521 relative to the ground. Similarly, a bottom adjustable section 516b can be used to adjust the height of the bottom fence wires 522 relative to the ground. Although depicted as having both top and bottom adjustable sections, the fence post 504 can be built to have no adjustable section or have only one of the top or bottom adjustable section. In an embodiment, the adjustable section can be realized with an actuator that changes the length of an adjustable rod.

The fence post 504 can also include a robot interface section 518 for mechanically and/or electrically coupling the fence post 504 to the robot machine 502. The robot interface section 518 can include a hollow section for receiving wires from the top sections 514 and the bottom sections 512 which then connect to a power source (e.g., a battery) on the robot machine 502. The robot interface section 518 couples to the robot machine 502 such that the robot machine 502 can freely swing around the fence post 504 at a radius specified by length of the separation 510 between the robot machine 502 and the fence post 504. The robot machine 502 can include an adjustable section 506 for adjusting the height of the robot machine 502. The adjustable section 506 can be realized as already described above with respect to using one or more lift arms 304, 306 (FIG. 3). The adjustable section 506 can also be realized with extendable rods or other methods.

In some implementations, the robot interface section 518 contains multiple sections. In the example shown in FIG. 5A, the robot interface section 518 is detachable at an interface 508. The interface 508 can include electrical and/or mechanical connectors for coupling the robot machine 502 to the rest of the robot interface section 518. The interface 508 allows the robot machine 502 to disengage or detach from the fence post 504. That way, a robot machine running low on battery can safely disengage from the fence post and return to a charging station, and a second robot machine can take its place.

Figure 6:
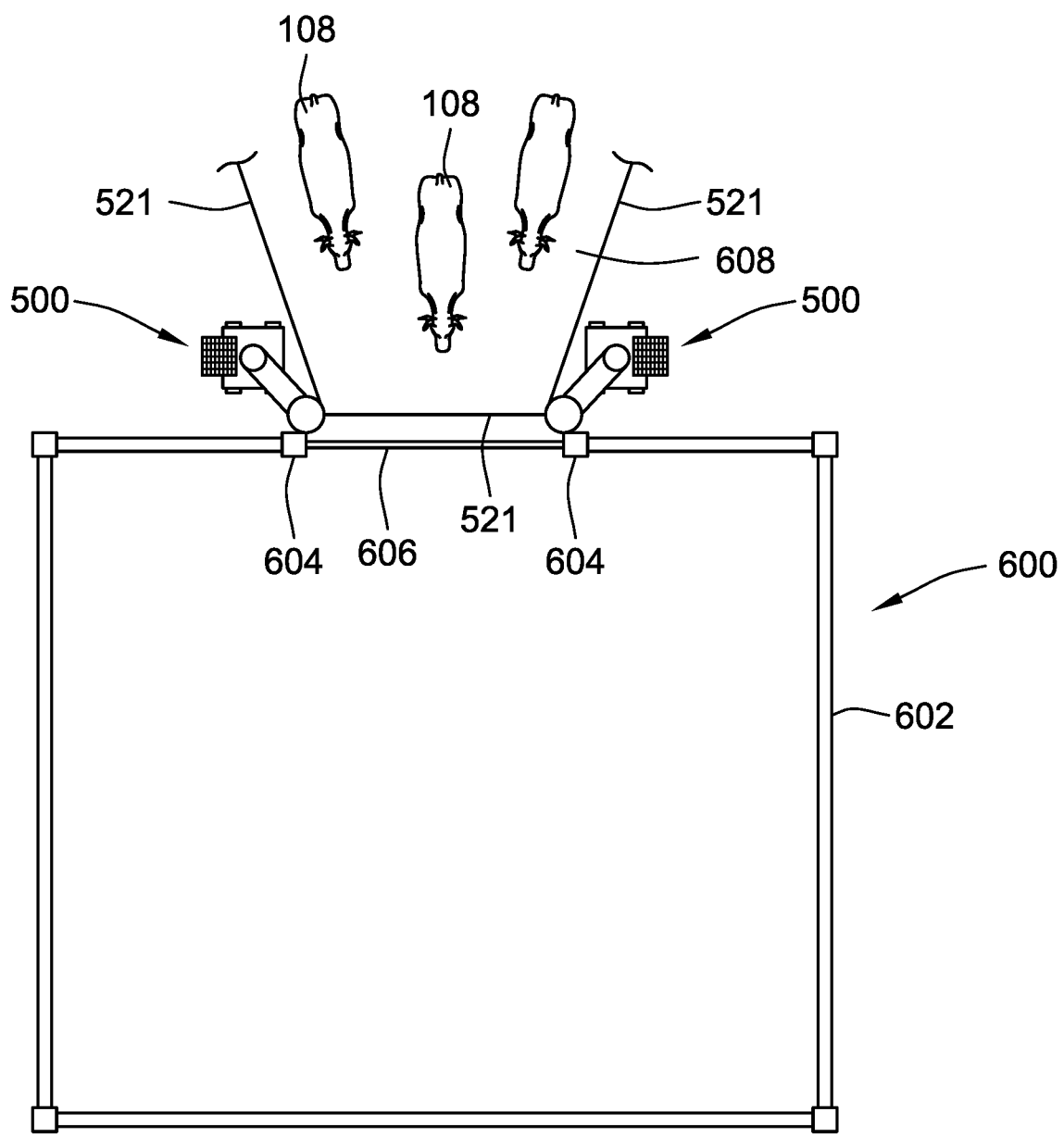
FIG. 6 is an illustration of autonomous robot machines engaging with a building according to an embodiment of the disclosure.

FIG. 6 is an illustration of autonomous robot machine systems 500 engaging with a building 600 according to an embodiment of the disclosure. The building 600 (e.g., a barn) includes one or more walled sections 602 and a door 606. Proximate to door hinges or edges of the door 606 are two vertical stations 604 for receiving fence posts (e.g., the fence post 504) from the robot machine systems 500. When the robot machine systems 500 engage with the vertical stations 604, a top section (e.g., the top section 514a) from each post engaging with the vertical stations 604 is removed and lifted up by an actuator of the vertical stations 604. By lifting the top sections by the actuator, the top fence wire 521 between the two robot machine systems 500 engaging the vertical stations 604 moves up to a height of the door 606 or above the door 606. Tension in the bottom wires (e.g., the bottom wire 522a) between the two robot machine systems 500 engaging the vertical stations 604 is relaxed and the bottom wire is allowed to slack and rest on the ground. That way, the animals 108 are allowed to move from enclosed area 608 through the door 606 and inside the building 600. The door 606 can automatically open once the fence posts engage with the vertical stations 604, or can open when the top sections of the fence posts are removed, or can open once tension in the bottom wire is slacked.

Autonomous robot machines 110 or robot machine systems 500 according to some embodiments of the disclosure can share power with each other through neighboring fence wire. In an example, a master machine can receive battery status information from the other robot machines 110 and then instruct one or two neighboring robot machines 110 to provide power via the fence wire 210 to charge a battery of a robot machine with battery life below a preferred threshold. Alternatively, the master machine can alert the remote controller device 104 of the battery status of the robot machine with battery life below the preferred threshold to signal a maintenance request or a request to return to a home base. Although described in the context of the master-slave dynamic, in some embodiments, when any of the robot machines 110 senses its battery is being depleted too quickly, it can request or communicate directly with the remote controller device 104 to return to the home base.

In some implementations, the robot machine systems 500 that support the robot machine 502 disengaging from the fence post 504 via the interface 508 can allow the robot machine 502 to unplug and return to the home base without having to have other robot machine systems join it. In some implementations, the robot machine systems 500 can generate an alarm when battery life is almost depleted.

In some embodiments, the robot machines 110 and the robot machine systems 500 engage with other electronic devices, e.g., one or more unmanned aerial vehicles (or drones) and other robots. The other electronic devices can help the robot machines 110 take better care of the animals 108 within the fenced enclosure.

In an embodiment, one or more helper robots can bring items to the animals 108 within the fenced enclosure. The helper robots can transport food, medicine, water, and so on to the animals 108 within the enclosure. The helper robots can have a mostly flat shape that allows them to slip under the lowest fence wire 210 to get inside the fenced enclosure. Alternatively, the robot machine systems 500 can adjust the height of the bottom fence wire 522 relative to the ground to allow a helper robot to slip under the bottom fence wire 522. The height of the bottom fence wire 522 can be adjusted by retracting the bottom adjustable section 516 to lift up the bottom fence wire 522 and/or by extending the adjustable section 506 to make the robot machine 502 seem taller.

The helper robots can also be flying drones that deliver items (e.g., medicine, food, and so on) to the animals 108 within the fenced enclosure. To reduce energy consumption of the helper robots with payloads flying to fenced enclosure, the top fence wire 521 can be lowered such that the helper robots can enter the fenced enclosure at a lower altitude. Methods of lowering the top fence wire 521 are similar to those as discussed above with respect to raising the bottom fence wire 522 and is not repeated.

The helper robots can be used to herd the animals 108 in coordination with the robot machines 110 to move to a different grazing area. The helper robots can use auditory and/or visual cues to guide the animals 108. A helper robot that enters the fenced area under a fence wire can use food or some interesting object to attract the animals 108 to move toward it such that the robot machines 110 can move the fence wires as the animals 108 clear certain areas of the fenced enclosure.

The helper robots can be drones with normalized difference vegetation index (NDVI) cameras to detect vegetative state of the land. The helper robots with the NDVI camera can show, over time, devegetization of the land 102 as a measure of the available grazable area on the land. The helper robots can provide this information to the robot machines 110 to aid the robot machines 110 in determining an appropriate time to move to a different grazing area. In some embodiments, the robot machines 110 have NDVI cameras and can locally adjust the shape and/or area of the fenced enclosure. For example, the robot machine 110a determines that nearby vegetation is looking less green, and to reduce animal consumption of vegetation in its nearby region, moves to exclude the nearby region from the fenced enclosure. The robot machine 110a can communicate its intention to move and can coordinate the move with the other robot machines 110. The other robot machines 110 can either remain in place and maintain tension in the fence wires 210 while the robot machine 110a is moving or can move with the robot machine 110a while maintaining tension in the fence wires 210.

The helper robots and/or the remote controller device 104 can provide a shape and traversal pattern around an area of land to promote consistent grazing such that no area on the land 102 is over-grazed. The helper robots and/or the remote controller device 104 can help reduce spots on the land 102 that lack vegetation due to over-grazing. The helper robots with NDVI cameras can capture devegetization information for the land 102. The helper robots and/or the remote controller can then determine a traversal path for the robot machines 110 through the land 102. The traversal path information can also include shape of the fenced enclosure as the robot machines 110 move through the land 102. FIG. 1 shows an example where shape of the fenced enclosure changes at each grazing area. The traversal path information can take into account the shape of the fenced enclosure to maintain a fixed area for the animals 108 during the herding process so that the animals 108 have a fixed amount of space (or area) within the fenced enclosure.

What is claimed is:

1. A system of autonomously and automatically moving robot machines connected together to form a fence enclosure to contain grazing animals therewithin, comprising:
a plurality of robot machines, each including:
an electronic controller;
a motor assembly controlled by the electronic controller;
a motorized locomotion assembly powered by the motor assembly to cause the robot machine to move in coordination with others of the robot machines to maintain the fence enclosure from one grazing location to another,
each of the robot machines including a wireless transceiver such that the respective electronic controller is configured to communicate with a remote wireless transceiver so that the plurality of robot machines mutually coordinate their respective movements according to a grazing optimization algorithm to move synchronously to different grazing locations on an area of land and to collectively arrange themselves autonomously to form a new fence enclosure having the same or a different configuration from the fence enclosure, the grazing optimization algorithm being configured to automatically determine optimum positions and locations of the robot machines and areas to form fence enclosures on a plot of land,
at least one of the robot machines having an imaging sensor configured to detect information about one or more of the grazing animals within the fence enclosure,
the electronic controller of the at least one of the robot machines being configured to communicate a signal indicating that the one or more of the grazing animals has moved outside or beyond the fence enclosure as detected by the imaging sensor,
the electronic controller of the at least one of the robot machines being configured to use a pattern recognition or anomaly detection algorithm to automatically recognize that one or more of the grazing animals is about to move or has moved beyond the perimeter of the fence enclosure and to track those of the animals that continually approach a boundary of the fence enclosure or one of the robot machines to send information regarding those tracked animals, each of the robot machines including an actuator coupled to a support, the electronic controller being configured to change a vertical angle of the support by which a fence wire is supported to adjust a position of the fence wire above a ground surface of an area of land and to prevent the fence wire from contacting the ground surface while one or more of the robot machines are moving the fence enclosure from one location to another.

2. The system of claim 1, wherein the remote wireless transceiver is a wireless transceiver of one of the robot machines or a remote controller device.

3. The system of claim 2, the remote controller device being configured to communicate a perimeter shape of the configuration of the fence enclosure.

4. The system of claim 3, wherein the remote controller device is configured to determine a duration of time within which the area of land is to be grazed by the grazing animals and to determine a path and a movement timing of each of the robot machines to carry out rotational grazing of the area of land.

5. The system of claim 4, wherein the configuration includes topographical elevation information of the area of land.

6. The system of claim 1, at least one of the robot machines being configured to communicate wirelessly with a sensor secured to at least one of the grazing animals and to communicate data received or based on from an output of the sensor to the remote wireless transceiver or a remote controller device.

7. The system of claim 1, each of the robot machines including a solar panel and a battery recharged by the solar panel and providing power for the motor assembly, the electronic controller, and an electric wire loop of the fence enclosure.

8. The system of claim 1, each of the robot machines including a wire tensioner configured to coil up the fence wire received by the each of the robot machines to maintain a tension on the fence wire and keep the fence wire taut around the entire fence enclosure, including as the robot machines traverse the area of land.

9. The system of claim 1, at least one robot machine in the plurality of robot machines being coupled to a fence post forming part of a boundary of the fence enclosure.

10. The system of claim 9, wherein the at least one robot machine is detachable from its respective fence post without compromising the boundary of the fence enclosure.

11. The system of claim 9, wherein the at least one robot machine is configured to swing around its respective fence post without compromising the boundary of the fence enclosure.

12. The system of claim 9, wherein the fence post includes one or more adjustable sections for adjusting the fence enclosure to allow access to the grazing animals.

13. The system of claim 12, each of the robot machines including a wireless transceiver such that the electronic controller is configured to communicate with one or more helper robots for providing the helper robots access to the grazing animals, at least one of the one or more helper robots having a generally flat top and a height configured to permit the at least one helper robot to slip under the fence enclosure.

14. The system of claim 9, wherein each fence post is configured to engage with an entrance of an enclosed area thus allowing the grazing animals to move from the fenced enclosure to the enclosed area.

15. The system of claim 14, wherein the electronic controller is configured to release tension in a fence wire connected to an engaged fence post.

16. The system of claim 1, each of the robot machines including a speaker and the electronic controller configured to cause the speaker to produce a sound for herding the grazing animals before the robot machine moves in coordination with others of the robot machines, wherein the sound is a learned sound that the grazing animals respond to within an auditory range of the grazing animals, the learned sound including a sound of a person's voice, the electronic controllers of the robot machines being configured to coordinate the sound produced by the speaker of each respective one of the robot machines to move in a direction guided by the coordinated sound.

17. The system of claim 6, wherein a haptic device is secured to the at least one grazing animal and is configured to emit haptic signals thereto to cause the animal to move to a new location.

18. The system of claim 1, responsive to determining that one of the animals has escaped the fence enclosure, the electronic controller of at least one of the robot machines being configured to raise an alert indicating a position or last known position of the escaped animal.

19. The system of claim 1, further comprising a computer vision algorithm configured to identify a shaded area, the electronic controller of the at least one of the robot machines being configured to guide the grazing animals toward an identified the shaded area.

20. The system of claim 1, wherein the electronic controller of at least one of the robot machines is configured to determine that the at least one of the robot machines has toppled over, and, responsive thereto, send an alarm indicating that the at least one of the robot machines has toppled over.

* * * * *